US012526342B2

(12) United States Patent
Dawkins et al.

(10) Patent No.: US 12,526,342 B2
(45) Date of Patent: Jan. 13, 2026

(54) SPLIT RENDERING FOR LIGHTFIELD IMMERSIVE MEDIA USING PROXY-EDGE-CLOUD ARCHITECTURE

(71) Applicant: TENCENT AMERICA LLC, Palo Alto, CA (US)

(72) Inventors: Paul Spencer Dawkins, Garland, TX (US); Rohit Abhishek, San Jose, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/654,701

(22) Filed: May 3, 2024

(65) Prior Publication Data

US 2024/0291902 A1     Aug. 29, 2024

Related U.S. Application Data

(63) Continuation of application No. 18/072,324, filed on Nov. 30, 2022, now Pat. No. 12,003,601.

(60) Provisional application No. 63/284,956, filed on Dec. 1, 2021.

(51) Int. Cl.
*H04L 67/56* (2022.01)
*H04L 65/75* (2022.01)

(52) U.S. Cl.
CPC ............ *H04L 67/56* (2022.05); *H04L 65/75* (2022.05)

(58) Field of Classification Search
CPC ................................ H04L 67/56; H04L 65/75
See application file for complete search history.

(56) References Cited

U.S. PATENT DOCUMENTS

| 9,406,104 B2* | 8/2016 | Nara ................ H04N 19/124 |
| 11,128,916 B2* | 9/2021 | Mayhew ........... H04N 21/8456 |
| 11,625,806 B2* | 4/2023 | Melkote Krishnaprasad ............. G06F 8/38 345/633 |
| 12,003,601 B2* | 6/2024 | Dawkins ............... H04L 65/75 |
| 2006/0164560 A1* | 7/2006 | Watanabe ............ G06F 16/739 348/700 |

(Continued)

FOREIGN PATENT DOCUMENTS

| JP | 2021-111961 A | 8/2021 |
| WO | 2021/194583 A1 | 9/2021 |

OTHER PUBLICATIONS

International Search Report dated Mar. 9, 2023 in Application No. PCT/US22/1475.

(Continued)

*Primary Examiner* — Dhairya A Patel
(74) *Attorney, Agent, or Firm* — Sughrue Mion, PLLC

(57) ABSTRACT

A system and method for split rendering immersive media using proxy edge cloud computing architecture. The system and method may include dynamically determining a task-split or splitting a task for rendering a scene in an immersive media stream into two or more computational tasks based on one or more processing delays, wherein the task-splitting splits the scene into first part including one or more first tasks performed by an edge computing system and second part including one or more second tasks performed by a cloud computing system. The system and method may include transmitting the first parts of the scene, and transmitting the second parts of the scene.

6 Claims, 4 Drawing Sheets

(56) References Cited

U.S. PATENT DOCUMENTS

| | | | |
|---|---|---|---|
| 2012/0141089 A1* | 6/2012 | Hunt | H04N 21/2385 |
| | | | 386/239 |
| 2016/0191356 A1* | 6/2016 | Sundaresan | H04L 65/612 |
| | | | 709/224 |
| 2018/0027181 A1* | 1/2018 | Roulet | G06T 5/70 |
| | | | 348/38 |
| 2019/0149864 A1* | 5/2019 | Britt | H04N 21/4788 |
| | | | 725/28 |
| 2020/0045350 A1* | 2/2020 | Hegde | H04N 21/6582 |
| 2020/0221159 A1* | 7/2020 | Stockhammer | H04N 21/23439 |
| 2020/0244723 A1* | 7/2020 | Khalid | G06F 16/178 |
| 2020/0329187 A1* | 10/2020 | Huang | H04N 23/73 |
| 2020/0334893 A1* | 10/2020 | Jiang | G06T 19/00 |
| 2020/0351384 A1* | 11/2020 | Ruistola | H04L 67/14 |
| 2020/0404327 A1 | 12/2020 | Han et al. | |
| 2021/0158045 A1* | 5/2021 | Robinson | G06T 19/006 |
| 2021/0314379 A1* | 10/2021 | Sodagar | H04L 65/762 |
| 2024/0012078 A1* | 1/2024 | Nevo | G01R 33/5608 |

OTHER PUBLICATIONS

Written Opinion of the International Searching Authority dated March 9, 2023 in Application No. PCT/US22/1475.

Communication issued Jan. 7, 2025 in Japanese Application No. 2023-566907.

* cited by examiner

SPLIT RENDERING FOR LIGHTFIELD IMMERSIVE MEDIA USING PROXY-EDGE-CLOUD ARCHITECTURE

CROSS-REFERENCE TO RELATED APPLICATION

This application is a Continuation Application of U.S. application Ser. No. 18/072,324 filed Nov. 30, 2022, which claims the priority benefit of U.S. Provisional Application No. 63/284,956 filed on Dec. 1, 2021, at the United States Patent and Trademark Office, the disclosure of which is incorporated herein by reference.

FIELD

The disclosed subject matter relates to methods and systems for split rendering for immersive media. More specifically, the disclosed subject matter relates to methods and systems for split rendering for immersive media using proxy-edge-cloud computing architecture.

BACKGROUND

Immersive media is defined by immersive technologies that attempt to create, or imitate the physical world through digital simulation, thereby stimulating any or all human sensory systems so as to create the perception of the user being physically present inside the scene.

There are different types of immersive media technologies currently in play: Virtual Reality (VR), Augmented Reality (AR), Mixed Reality (MR), Light Field/Holographic, etc. VR refers to a digital environment replacing the user's physical environment by using a headset to place the user in a computer-generated world. AR on the other hand takes digital media and layers them on the real world around you by using either a clear vision glasses or smartphone. MR refers to blending of the real world with digital world thereby creating an environment in which technology and physical world can co-exist.

Light field/Holographic technologies consist of light rays in 3D space with rays coming from each point and direction. This technology is based on the concept that everything which is seen is illuminated by light coming from any source, travelling via space, and hitting the surface of the object where the light is partly absorbed and partly reflected to another surface before reaching our eyes. What exact light rays reaches our eyes depends on the user's precise position in the light field, and as the user moves around, the user perceives part of the light field and uses that perceived part to get an idea about the position of the object.

Light rays may be defined by 5 dimensional plenoptic operations where each ray may be defined by three coordinates in 3D space (3 dimensions) and two angles to specify the direction in 3D space.

A traditional camera is only able to capture a 2D representation of the light rays which reaches the camera lens at a given position. The image sensor records the sum of the brightness and color of all light rays reaching each pixel.

When it comes to capturing content for light field or holographic based displays, a light field camera is required which is capable of not only capturing brightness and color but also the direction of all light rays reaching the camera sensors. Using this information, a digital scene may be reconstructed with accurate representation of origin of each light ray making it possible to reconstruct the exact captured scene digitally in 3D.

Currently two major techniques are used to capture such volumetric scenes. The first technique is using an array of cameras or camera modules to capture different rays/views from each direction. The second technique consists of using a depth camera which may capture 3D information in a single exposure without needing structured illumination by measuring depth of multiple objects under controlled lighting conditions.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In accordance with an exemplary embodiment, a method for split rendering immersive media using proxy edge cloud computing architecture. The method may be executed by one or more processors, the method may include determining, by a rendering proxy server, that an end device consuming immersive media has a limited resource capacity; splitting, by the rendering proxy server, a task of rendering a scene in an immersive media stream into a plurality of tasks; dynamically grouping, by the rendering proxy server, the plurality of tasks into two or more computational tasks based on one or more processing delays, wherein a first group of the two or more computational tasks is to be performed by an edge computing system and a second group of the two or more computational tasks is to be performed by a cloud computing system; transmitting, by the rendering proxy server, first parts of the scene corresponding to the first group of the two or more computational tasks to the edge computing system for rendering the first parts of the scene; and transmitting, by the rendering proxy server, second parts of the scene corresponding to the second group of the two or more computational tasks to the cloud computing system for rendering the second parts of the scene.

In accordance with an exemplary embodiment, an apparatus for split rendering immersive media using proxy edge cloud computing architecture. The apparatus may include at least one memory configured to store program code; and at least one processor configured to read the program code and operate as instructed by the program code. The program code may include first determining code configured to cause the at least one processor to determine, by a rendering proxy server, that an end device consuming immersive media has a limited resource capacity; splitting code configured to cause the at least one processor to split, by the rendering proxy server, a task of rendering a scene in an immersive media stream into a plurality of tasks; first grouping code configured to cause the at least one processor to dynamically group, by the rendering proxy server, the plurality of tasks into two or more computational tasks based on one or more processing delays, wherein a first group of the two or more computational tasks is to be performed by an edge computing system and a second group of the two or more computational tasks is to be performed by a cloud computing system; first transmitting code configured to cause the at least one processor to transmit, by the rendering proxy server, first parts of the scene corresponding to the first group of the two or more computational tasks to the edge computing system for rendering the first parts of the scene; and second transmitting code configured to cause the at least one processor to transmit, by the rendering proxy server, second parts of the scene corresponding to the second group of the two or more computational tasks to the cloud computing system for rendering the second parts of the scene.

In accordance with an exemplary embodiment, a non-transitory computer-readable medium storing instructions may be provided. The instructions may include one or more instructions that, when executed by one or more processors of a device for split rendering immersive media using proxy edge cloud computing architecture, cause the one or more processors to determine that an end device consuming immersive media has a limited resource capacity; split a task of rendering a scene in an immersive media stream into a plurality of tasks; dynamically group the plurality of tasks into two or more computational tasks based on one or more processing delays, wherein a first group of the two or more computational tasks is to be performed by an edge computing system and a second group of the two or more computational tasks is to be performed by a cloud computing system; transmit first parts of the scene corresponding to the first group of the two or more computational tasks to the edge computing system for rendering the first parts of the scene; and transmit second parts of the scene corresponding to the second group of the two or more computational tasks to the cloud computing system for rendering the second parts of the scene.

Additional embodiments will be set forth in the description that follows and, in part, will be apparent from the description, and/or may be learned by practice of the presented embodiments of the disclosure.

BRIEF DESCRIPTION OF THE DRAWINGS

The foregoing and other objects, features, and advantages of the disclosure are apparent from the following detailed description taken in conjunction with the accompanying drawings in which like parts are given like reference numerals and, wherein.

Figure 1:
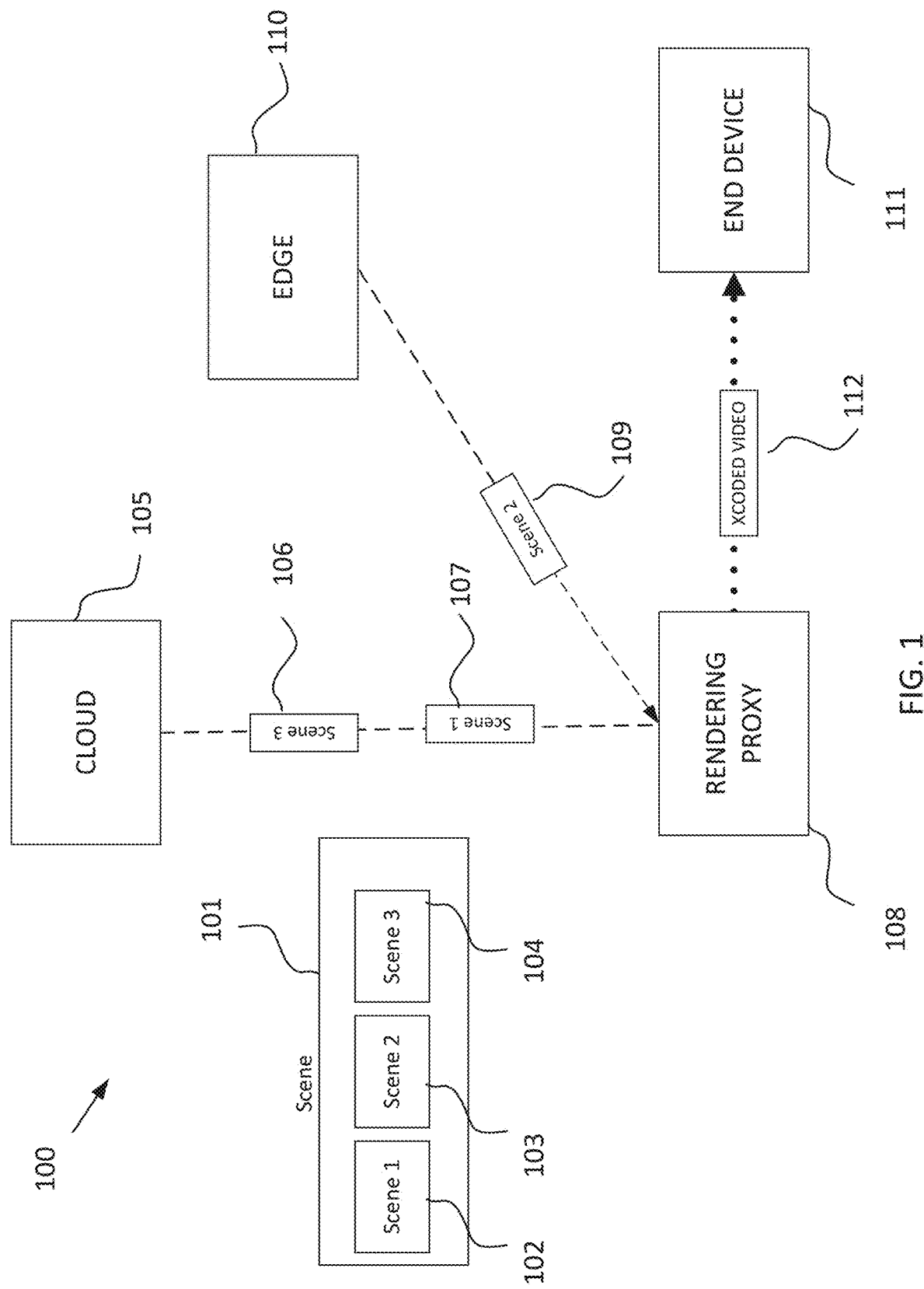
FIG. 1 illustrates an exemplary block diagram of a proxy-edge-cloud computing architecture for dynamically split rendering immersive media, according to an embodiment of the present disclosure.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to a system and method of split rendering for lightfield or immersive media by using a rendering proxy, an edge-cloud, and cloud based architecture. It may be referred to as a proxy-edge-cloud architecture herein.

In related art, all computing devices and their performances are dependent on increase in computer power. Following Moore's law, the computing power continues to increase exponentially, as a result of adding more processing cores and bandwidth, besides increase in speed and reduction in chip size. However, with high performance apps, the requirement on the capacity and processing requirements are increasing. To bridge this gap an edge-cloud based rendering architecture may be required.

Cloud-based computing offers the end-user with more ways of accessing the massive amount of computational capacity needed for modern computer graphics. With the current debate on how much processing one of ordinary skill in the art may fit in a smart-phone or in any AR/VR devices to render high quality video frames, the shift to cloud-rendering has elevated rendering of high quality video frames. Therefore, if sufficiently fast connections to significantly powerful online computing resources may be opened up, all small devices may be able to become a supercomputer, capable of streaming real-time videos and games.

While an edge-cloud based split rendering architecture may be used for lightfield/immersive media streaming and the edge-cloud based split rendering architecture reduces the amount of local processing power required, but not all user devices have even this reduced amount of local processing power. To bridge this gap, a proxy-edge-cloud split rendering architecture is required. This substitutes a rendering proxy for the end device in the edge-cloud and other architectures, with the rendering proxy transcoding or transforming the rendered scene into a video format that is more easily processed on devices with limited local processing ability.

Embodiments of the present disclosure are directed to split rendering for LightField/Immersive Media using proxy-edge-cloud architecture enabling mobile devices with lower processing capacity/power to render and stream lightfield/immersive media.

In an embodiment, a proxy-edge-cloud based split rendering architecture may be used for lightfield/Immersive media streaming. This reduces the requirement for processing locally on the end device itself. For instance, an end device might not require a GPU to provide acceptable user experience. The task split between the edge and the cloud may be dynamic, i.e., the task split between the edge and the cloud may be based on factors like sampling delay, computational delay inclusive of image processing and frame rendering delay, and networking delay comprising of queuing and transmission delay.

FIG. 1 an exemplary block diagram of a proxy-edge-cloud computing architecture 100 for dynamically split rendering immersive media, according to an embodiment of the present disclosure.

Refer to FIG. 1, where a scene 101 may be split into three computational tasks (also referred to as components or parts of a scene 102, 103, 104). The end device 108 based on the different deciding parameters streams scene 1 107 and scene 3 106 from the cloud 105 (also referred to as cloud computing system) and scene 2 109 from the edge 110 (also referred to as edge computing system). For the avoidance of doubt, references to a "scene" herein are by way of example only, and "scene" should be understood to include any media susceptible to streaming.

According to an aspect of the present disclosure, as the rendering proxy 108 receives scenes from the cloud 105 and from the edge 110, the rendering proxy 108 transcodes or transforms these scenes into less computationally demanding formats and sends this transformed video 112 to the ultimate end device 111, which renders the transformed video for the end user.

In some embodiments, the rendering proxy 108 may determine the end device's capabilities, and then apply an appropriate transcoding technique for the end device. In some embodiments, the rendering proxy 108 may vary the transcoding technique or transcoding parameters used on behalf of an end device dynamically, based on feedback from the end device. In some embodiments, the rendering proxy 108 may transcode some scenes and forward other scenes to the end device without transformation, as received from the cloud 105 and edge 110. In some embodiments, the rendering proxy 108 may vary its decision to transcode some scenes and forward other scenes to the end device based on feedback from the end device.

Figure 2:
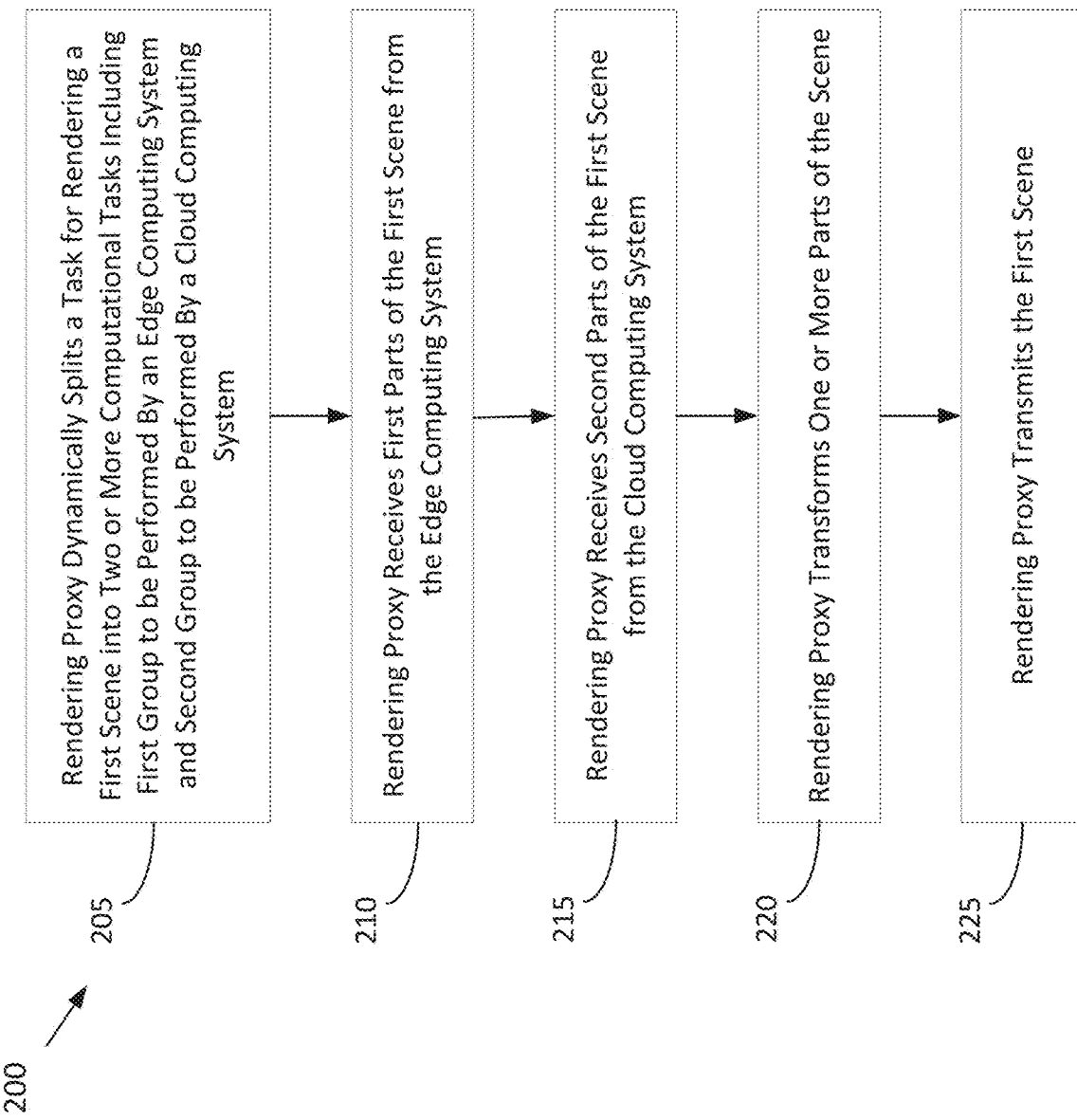
FIG. 2 illustrates an exemplary flowchart of a proxy-edge-cloud computing architecture for dynamically split rendering immersive media, according to an embodiment of the present disclosure.

FIG. 2 illustrates an exemplary flowchart of process 200 for dynamically split rendering immersive media using a proxy-edge-cloud computing architecture, according to an embodiment of the present disclosure.

As shown in FIG. 2, at operation 205, a processor of a rendering proxy server system may dynamically split a task or determine a task-split for rendering a scene in an immersive media stream into two or more computational tasks based on one or more processing delays. In some embodiments, the task-splitting may split the scene in one or more first tasks performed by an edge computing system and one or more second tasks performed by a cloud computing system As an example, the processor of the rendering proxy 108 server system may dynamically determine a task-split for rendering a scene 101 in an immersive media stream into two or more computational tasks (102, 103, 104) based on one or more processing delays.

In some embodiments, the processing delays may include one or more of a sampling delay, a computational delay, an image processing load, a frame rendering delay, and a networking delay, and wherein the networking delay further comprises a queuing and a transmission delay.

At operation 210, the processor of the rendering proxy server system may receive one or more first parts of the scene from a first processor of the edge computing system, wherein the one or more first parts of the scene may be based on the one or more first tasks performed by the edge computing system. As an example, the processor of the rendering proxy server 105 system may receive one or more first parts of the scene 102 from a first processor of the edge computing system 110.

At operation 215, the processor of the rendering proxy server system may receive one or more second parts of the scene from a second processor of the cloud computing system wherein the one or more second parts of the scene may be based on the one or more second tasks performed by the cloud computing system. As an example, the processor of the rendering proxy server 105 system may receive one or more second parts of the scene 103 and 104 a second processor of the cloud computing system 105.

At operation 220, the processor of the rendering proxy server system may transmit one or more parts of the scene. In some embodiments, the transmitted scene may be transformed or transcoded based on end device capability. In some embodiments, the transmitting may include the rendering proxy determining an end user device capability associated with an end user receiving the immersive media stream, and transforming the one or more parts of the scene into a computationally demanding format based on the end user device capability.

In some embodiments, the transforming is based on an end user device capability. In some embodiments, the end user device capability is based on a type of an end user device or a processing power of the end user device. In some embodiments, the processor of the rendering proxy 108 server system may determine the end user device's capabilities (e.g., end device 111), and then apply an appropriate transcoding technique for the end user device. In some embodiments, the processor of the rendering proxy 108 server system may vary the transcoding technique or transcoding parameters used on behalf of an end user device dynamically, based on feedback from the end user device. In some embodiments, the processor of the rendering proxy 108 server system may transcode some scenes and forward other scenes to the end user device without transformation, as received from the cloud 105 and edge 110. In some embodiments, the processor of the rendering proxy 108 server system may vary its decision to transcode some scenes and forward other scenes to the end user device based on feedback from the end user device.

At operation 225, the processor of the rendering proxy server system may transmit the scene including the first and second parts of the scene to the end user device. As an example, the processor of the rendering proxy 108 server system may transmit the scene including the one or more transformed parts of the scene or the second parts of the scene to the end device 111.

According to an aspect of the present disclosure, the process 200 may include additional operations performed by the processor of the rendering proxy server system. The additional operations may include receiving one or more second parts of the second scene from the second processor of the cloud computing system, transcoding one or more second parts of the second scene, and transmitting the second scene including the one or more transcoded second parts of the second scene and the one or more first parts of the second scene.

Figure 3:
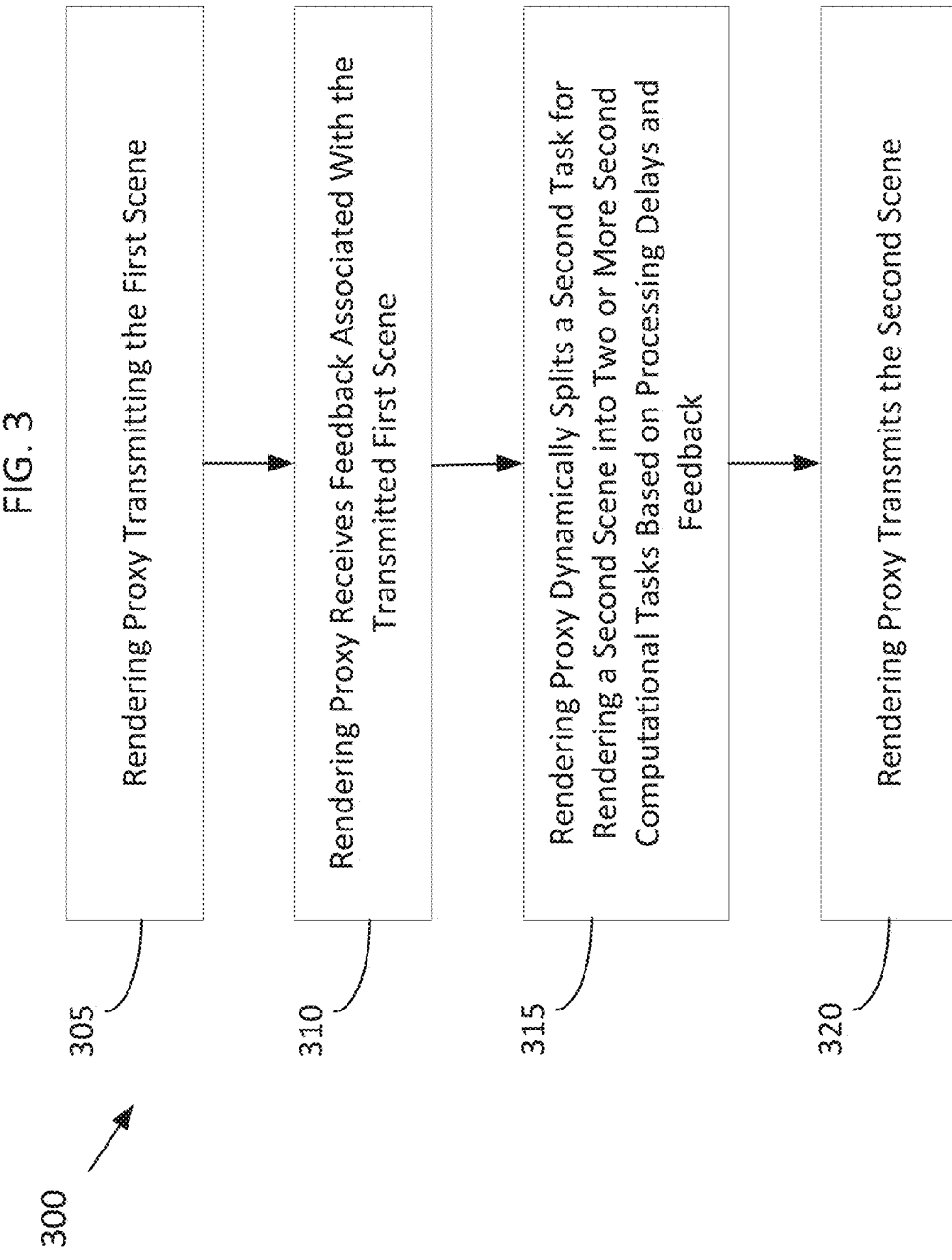
FIG. 3 illustrates an exemplary flowchart of a proxy-edge-cloud computing architecture for dynamically split rendering immersive media, according to an embodiment of the present disclosure.

FIG. 3 illustrates an exemplary flowchart of process 300 for dynamically split rendering immersive media using a proxy-edge-cloud computing architecture, according to an embodiment of the present disclosure.

As shown in FIG. 3, at operation 305, the processor of the rendering proxy server system may transmit the scene including the one or more first and second parts of the scene to the end user device. As an example, the processor of the rendering proxy 108 server system may transmit the scene including the one or more transformed parts of the scene to the end device 111.

At operation 310, the processor of the rendering proxy server system may receive feedback associated with the transmitted scene. At operation 315, the processor of the rendering proxy server system may dynamically split or determine a task-split for rendering a second scene in the immersive media stream into two or more second computational tasks based on the one or more processing delays and the feedback. Then, at operation 320, the processor of the rendering proxy server system may transform and/or transmitted one or more parts of the second scene.

It may be understood that operations 205-225 of process 200 and operations 305-320 of process 300 may be performed and/or combined in any order.

The techniques for split rendering for lightfield or immersive media using the proxy-edge-cloud architecture as disclosed herein may be implemented as computer software using computer-readable instructions and physically stored in one or more computer-readable media. For example, FIG. 4 shows a computer system 400 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 4:
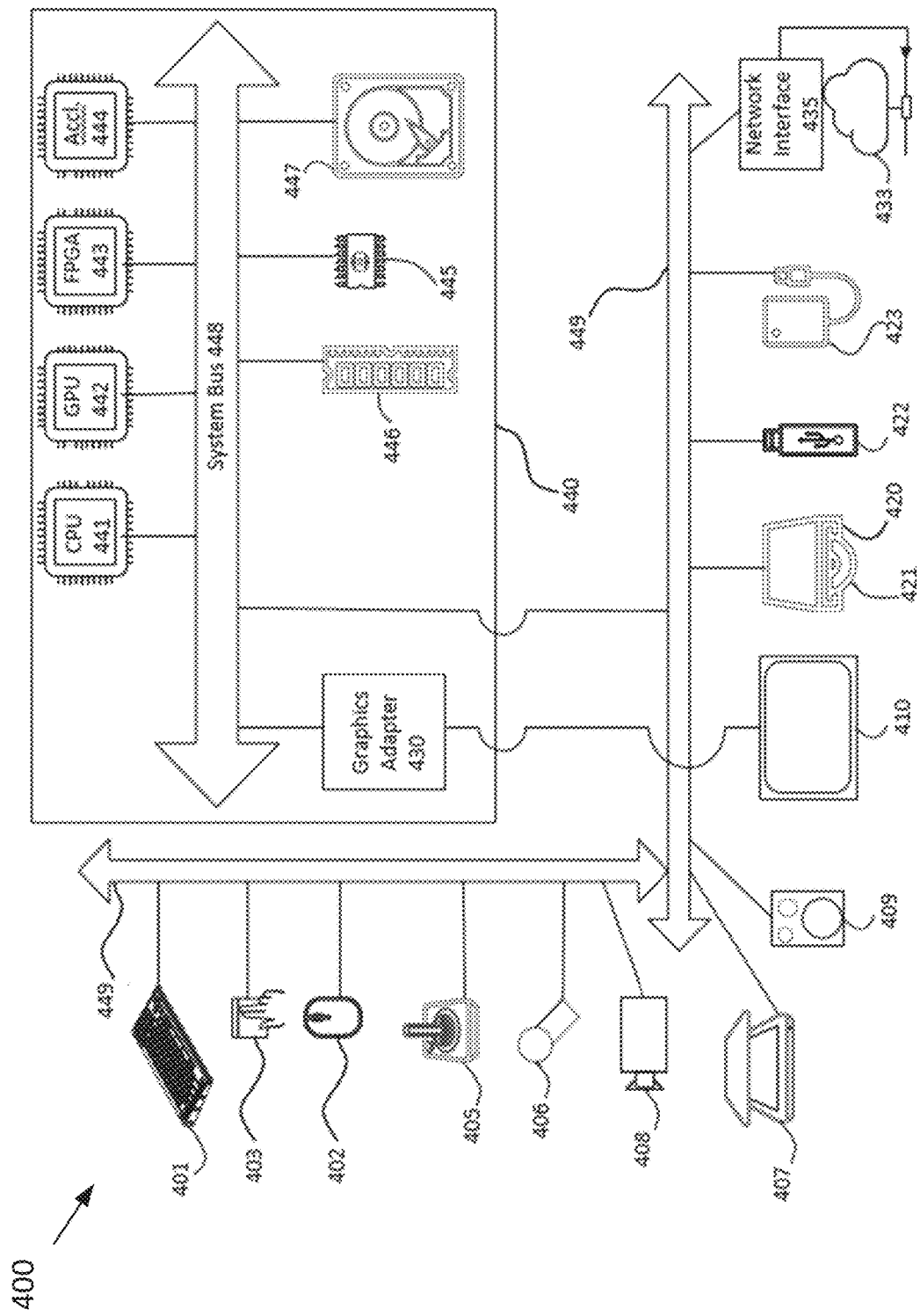
FIG. 4 a simplified block diagram of a communication system, according to an embodiment of the present disclosure.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 401, mouse 402, trackpad 403, touch screen 410, data-glove (not depicted), joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, data-glove (not depicted), or joystick 405, but there may also be tactile feedback devices that do not serve as input devices), audio output devices (such as speakers 409, headphones (not depicted)), visual output devices (such as screens 410 to include CRT screens, LCD screens, plasma screens, OLED screens, each with or without touch-screen input capability, each with or without tactile feedback capability-some of which may be capable to output two-dimensional visual output or more than three-dimensional output through means such as stereographic output); virtual-reality glasses (not depicted), holographic displays and smoke tanks (not depicted)), and printers (not depicted).

Computer system 400 may also include human accessible storage devices and their associated media such as optical media including CD/DVD ROM/RW 420 with CD/DVD or the like media 421, thumb-drive 422, removable hard drive or solid-state drive 423, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 400 may also include an interface to one or more communication networks. Networks can, for example, be wireless, wireline, optical. Networks may further be local, wide-area, metropolitan, vehicular, and industrial, real-time, delay-tolerant, and so on. Examples of networks include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example, USB ports of the computer system 400; others are commonly integrated into the core of the computer system 400 by attachment to a system bus as described below, for example Ethernet interface 435 into a PC computer system or cellular network 433 interface into a smartphone computer system). Using any of these networks, computer system 400 may communicate with other entities. Such communication may be uni-directional receive only (for example, broadcast TV), uni-directional send-only (for example, CANbus to certain CANbus devices), or bi-directional, for example to other computer systems using local or wide area digital networks. Certain protocols and protocol stacks may be used on each of those networks and network interfaces, as described above.

The aforementioned human interface devices, human-accessible storage devices, and network interfaces may be attached to a core 440 of the computer system 400.

The core 440 may include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 445, random-access memory 446, internal mass storage such as internal non-user accessible hard drives, SSDs, and the like 447, may be connected through a system bus 448. In some computer systems, the system bus 448 may be accessible in the form of one or more physical plugs to enable extensions by additional CPUs, GPU, and the like. The peripheral devices may be attached either directly to the core's system bus 448, or through a peripheral bus 449. Architectures for a peripheral bus include PCI, USB, and the like.

CPUs 441, GPUs 442, FPGAs 443, and accelerators 444 may execute certain instructions that, in combination, may make up the aforementioned computer code. That computer code may be stored in ROM 445 or RAM 446. Transitional data may be also be stored in RAM 446, whereas permanent data may be stored, for example, in the internal mass storage 447. Fast storage and retrieval to any of the memory devices may be enabled through the use of cache memory, which may be closely associated with one or more CPU 441, GPU 442, mass storage 447, ROM 445, RAM 446, and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, the computer system having architecture 400, and specifically the core 440 may provide functionality as a result of processor (s) (including CPUs, GPUs, FPGA, accelerators, and the like) executing software embodied in one or more tangible, computer-readable media. Such computer-readable media may be media associated with user-accessible mass storage as introduced above, as well as certain storage of the core 440 that are of non-transitory nature, such as core-internal mass storage 447 or ROM 445. The software implementing various embodiments of the present disclosure may be stored in such devices and executed by core 440. A computer-readable medium may include one or more memory devices or chips, according to particular needs. The software may cause the core 440 and specifically the processors therein (including CPU, GPU, FPGA, and the like) to execute particular processes or particular parts of particular processes described herein, including defining data structures stored in RAM 446 and modifying such data structures according to the processes defined by the software. In addition, or as an alternative, the computer system may provide functionality as a result of logic hardwired or otherwise embodied in a circuit (for example, accelerator 444), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for split rendering immersive media edge computing architecture, the method being executed by one or more processors of an electronic device, the method comprising:

receiving information on immersive media, wherein the immersive media comprises a plurality of scenes, and determining a first splitting the plurality of scenes for processing into a first scene to be transcoded by the electronic device and a remaining scene;

transmitting information associated with the first splitting to a first edge computing system and a cloud computing system;

receiving a first scene of the plurality of scenes from the first edge computing system;

transcoding the first scene, by the electronic device, into a less computationally demanding format based on a resource capability of a client device;

receiving non-transcoded scenes of the remaining scenes from a cloud computing system, the non-transcoded scenes being scenes that are received as is from the cloud computing system; and transmitting, by the electronic device, the immersive media comprising the first scene that is transcoded and the non-transcoded scenes to the client device;

receiving, by the electronic device and from the client device, feedback associated with an updated resource capability of the client device;

based on receiving the feedback associated with the updated resource capability of the client device and receiving information on new immersive media, determining a second splitting of a plurality of scenes of the new immersive media for processing into new first scene to be transcoded by the electronic device and a new remaining scene to be received from the cloud computing system;

transmitting information associated with the second splitting to the first edge computing system and the cloud computing system; and transmitting, by the electronic device, the new immersive media based on transcoding the new first scene and receiving new non-transcoded scenes of the new remaining scenes.

2. The method of claim 1, wherein the method further comprises determining that the client device that consumes the immersive media has a limited resource capacity based on media ingesting capability of the client device.

3. An apparatus for split rendering immersive media using edge computing architecture, the apparatus comprising:

at least one memory configured to store program code; and at least one processor configured to read the program code and operate as instructed by the program code, the program code including:

first receiving code configured to cause the at least one processor to receive information on immersive media, wherein the immersive media comprises a plurality of scenes, and determining a first splitting the plurality of scenes for processing into a first scene to be transcoded by the electronic device and a remaining scene;

first transmitting code configured to cause the at least one processor to transmit information associated with the first splitting to a first edge computing system and a cloud computing system;

second receiving code configured to cause the at least one processor to receive a first scene from the first edge computing system;

transcoding code configured to cause the at least one processor to transcode the first scene into a less computationally demanding format based on a resource capability of a client device;

third receiving code configured to cause the at least one processor to receive non-transcoded scenes of the plurality of scenes from a cloud computing system, the non-transcoded scenes being scenes that are received as is from the cloud computing system; and second transmitting code configured to cause the at least one processor to transmit the immersive media comprising the first scene that is transcoded and the non-transcoded scenes to the client device;

fourth receiving code configured to cause the at least one processor to receive, from the client device, feedback associated with an updated resource capability of the client device;

fifth receiving code configured to cause the at least one processor to, based on receiving the feedback associated with the updated resource capability of the client device and receiving information on new immersive media, determine a second splitting of a plurality of scenes of the new immersive media for processing into new first scene to be transcoded by the electronic device and a new remaining scene to be received from the cloud computing system;

second transmitting code configured to cause the at least one processor to transmit information associated with the second splitting to the first edge computing system and the cloud computing system; and third transmitting code configured to cause the at least one processor to transmit the new immersive media based on transcoding the new first scene and receiving new non-transcoded scenes of the new remaining scenes.

4. The apparatus of claim 3, wherein the program code further comprises first determining code comprises determining that the client device that consumes the immersive media has a limited resource capacity based on media ingesting capability of the client device.

5. A non-transitory computer-readable medium storing instructions, the instructions comprising: one or more instructions that, when executed by one or more processors of an electronic device for split rendering immersive media using edge computing architecture, cause the electronic device to:

receive, by the electronic device, information on immersive media, wherein the immersive media comprises a plurality of scenes, and determining a first splitting the plurality of scenes for processing into a first scene to be transcoded by the electronic device and a remaining scene;

transmit information associated with the first splitting to a first edge computing system and a cloud computing system;

receive a first scene of the plurality of scenes from the first edge computing system;

transcode the first scene into a less computationally demanding format based on a resource capability of a client device;

receive non-transcoded scenes of the plurality of scenes from a cloud computing system, the non-transcoded scenes being scenes that are received as is from the cloud computing system; and transmit, by the electronic device, the immersive media comprising the first scene that is transcoded and the non-transcoded scenes to the client devices;

receive, by the electronic device and from the client device, feedback associated with an updated resource capability of the client device;

based on receiving the feedback associated with the updated resource capability of the client device and receiving information on new immersive media, determine a second splitting of a plurality of scenes of the new immersive media for processing into new first scene to be transcoded by the electronic device and a new remaining scene to be received from the cloud computing system;

transmit information associated with the second splitting to the first edge computing system and the cloud computing system; and transmit, by the electronic device, the new immersive media based on transcoding the new first scene and receiving new non-transcoded scenes of the new remaining scenes.

6. The non-transitory computer-readable medium of claim 5, wherein the one or more instructions, when executed by the one or more processors of the electronic device for split rendering immersive media using the edge computing architecture, further cause the electronic device to:

determine that the client device that consumes the immersive media has a limited resource capacity based on media ingesting capability of the client device.

* * * * *